United States Patent Office 3,322,939
Patented May 30, 1967

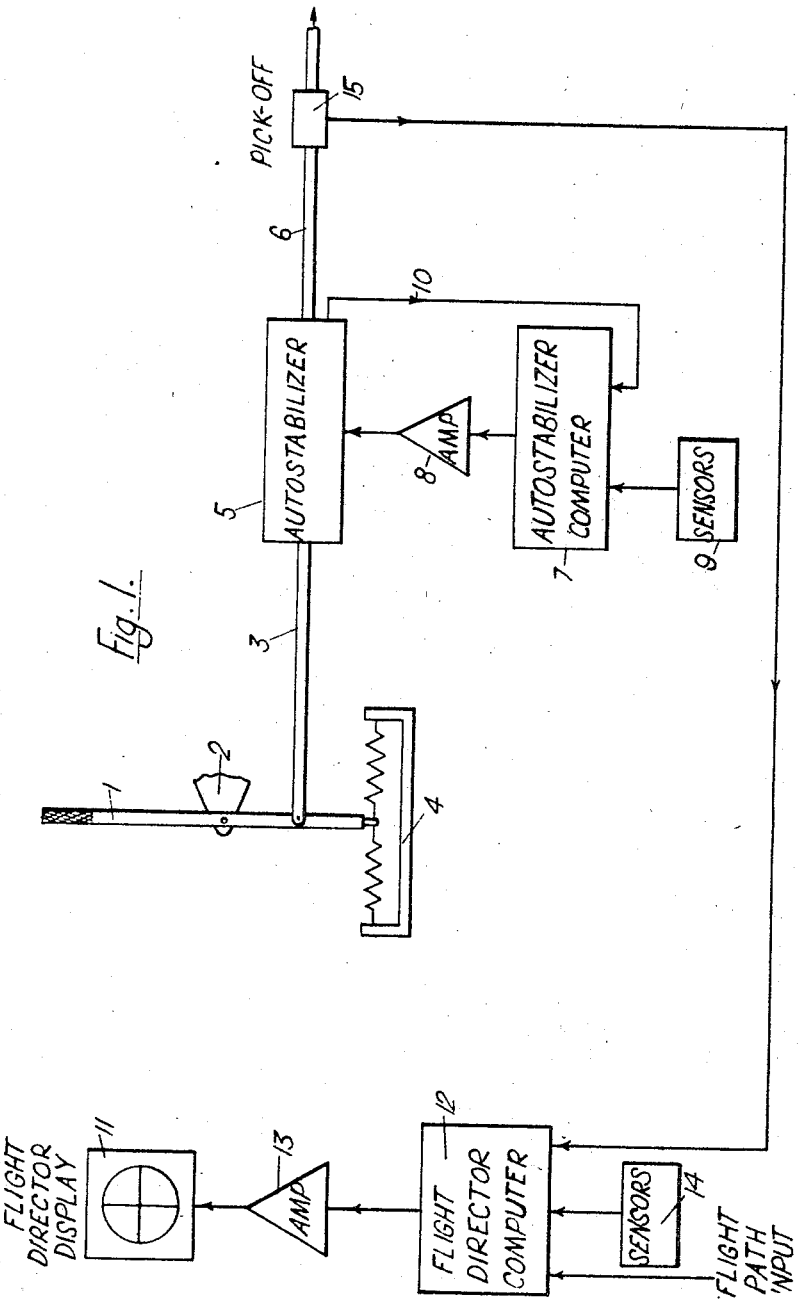

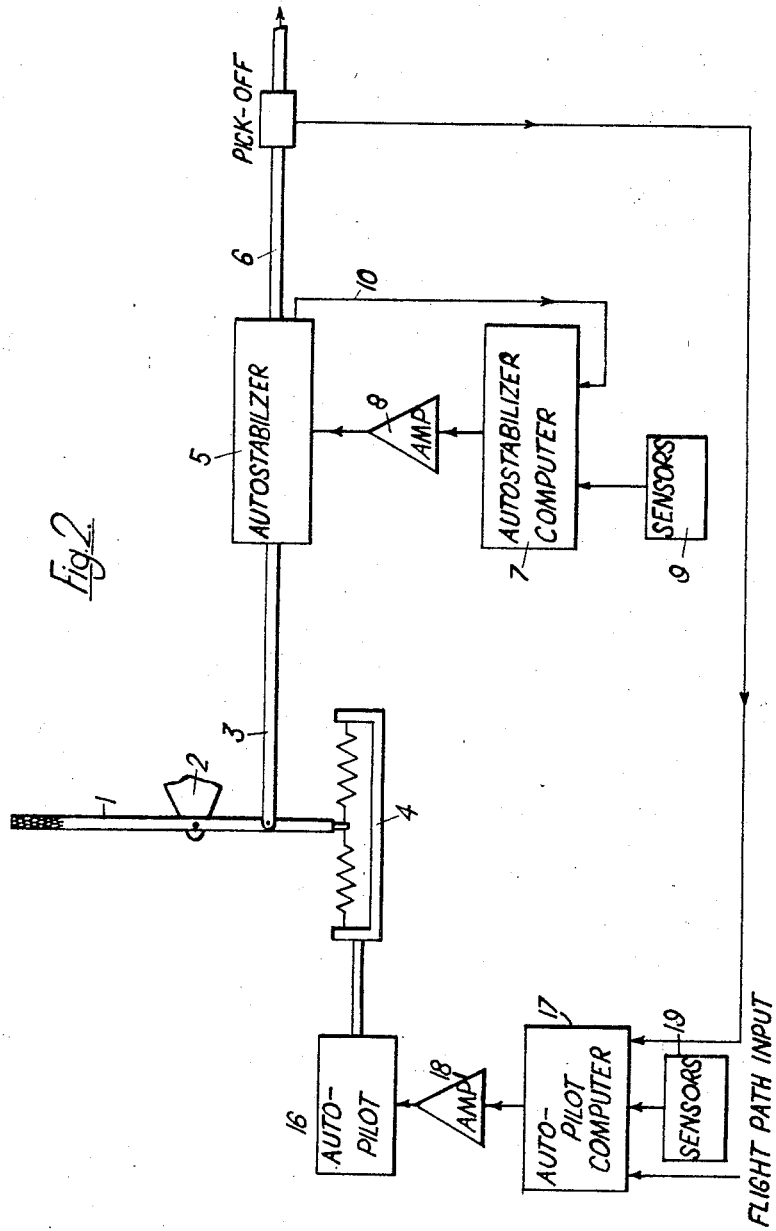

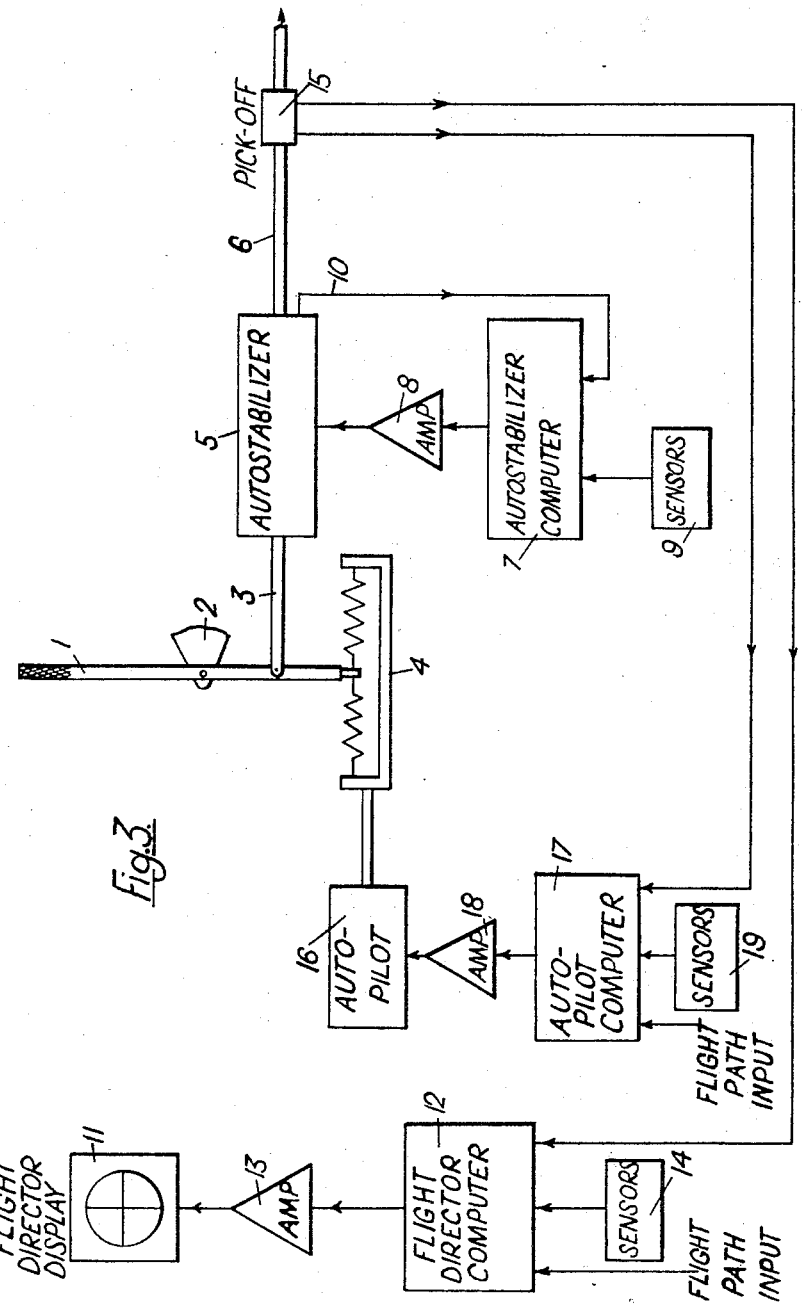

3,322,939
FLIGHT AID SYSTEM FOR INDICATING FAILURE
OF THE STABILIZING SYSTEM
Maurice Cecil Curties, Lightwater, and Oliver Beauchamp
St. John, Farnborough, England; said Curties assignor
to Ferranti Limited, Hollinwood, Lancashire, England,
a company of Great Britain and Northern Ireland
Filed Apr. 8, 1963, Ser. No. 271,395
Claims priority, application Great Britain, Apr. 13, 1962,
14,300/62
10 Claims. (Cl. 235—150.2)

This invention relates to flight aid systems.

More specifically the invention relates to flight aid systems of the kind including a limited authority servo system, usually known as an autostabilizer, connected in series with a control input and operating in response to signals from an autostabilizer computer to provide artificial stability to a craft. Hereinafter such flight aid systems are referred to as flight aid systems of the kind specified. The invention is particularly, although not specifically, suitable for use in craft having one or more phases of unstable flight, for example helicopters and aircraft designed for vertical take-off and landing or short take-off and landing.

The control input in flight aid systems of the kind specified may be provided by a pilot operating a control stick in accordance with computed information displayed on a flight director display. Alternatively, the control input may be provided by an autopilot controlled by computed signals and acting in parallel with the pilot's control stick. In both cases the computer supplying the information to the flight director or to the autopilot is designed to operate on the assumption that the craft to be controlled is maintained stable by the autostabilizer. In the event of a failure of the autostabilizer, however, the craft may become unstable with the result that the control demanded by the flight director or the control provided by the autopilot is no longer suitable for maintaining the craft in a desired state. If the craft is one having an unstable phase of flight and failure of the autostabilizer occurs during this phase the means available to the pilot for detecting and correcting the failure may not be adequate to maintain proper control of the craft.

It is an object of the present invention to provide a flight aid system of the kind specified in which compensation is provided in the event of failure of the autostabilizer.

According to the present invention a flight aid system includes a limited authority autostabilizer, an autostabilizer computer for controlling the operation of said autostabilizer, a flight director display, a flight director computer for controlling said flight director display, said flight director computer being designed to incorporate stabilizing control equations similar to those of said autostabilizer computer in addition to its flight path error functions, and feedback means for applying to said flight director computer during correct operation of said autostabilizer a negative feedback for cancelling the stabilizing information from the output of said flight director computer.

Also in accordance with the present invention a flight aid system includes a limited authority autostabilizer, an autostabilizer computer for controlling the operation of said autostabilizer, an autopilot, an autopilot computer for controlling the operation of said autopilot, said autopilot computer being designed to incorporate stabilizing control equations similar to those of said autostabilizer computer in addition to its flight path error function, and feedback means for applying to said autopilot computer during correct operation of said autostabilizer a negative feedback for cancelling the stabilizing information from the output of said autopilot computer.

The present invention further comprises a flight aid system including a limited authority autostabilizer, an autostabilizer computer for controlling the operation of said autostabilizer, a flight director display, a flight director computer for controlling the operation of said flight director display, an autopilot, an autopilot computer for controlling the operation of said autopilot, said flight director computer and said autopilot computer being designed to incorporate stabilizing control equations similar to those of said autostabilizer computer in addition to their flight path error functions, and feedback means for applying to said flight director computer and to said autopilot computer during correct operation of said autostabilizer a negative feedback for cancelling the stabilizing information from the output of said flight director computer and from the output of said autopilot computer.

The present invention will now be described by way of example with reference to the accompanying drawings in which:

FIGURES 1, 2 and 3 show schematic diagrams of different flight aid systems in accordance with the invention.

Referring now to FIGURE 1 of the drawings the flight aid system shown includes a pilot's control stick 1 pivoted to the aircraft structure 2 and connected to a control rod 3, a spring feel 4 being connected to the bottom end of the stick 1. A limited authority autostabilizer 5 is connected in series with the control rod 3 and actuates an output control rod 6 connected to a member to be controlled.

The autostabilizer 5 is controlled by output signals from an autostabilizer computer 7, the signals being applied to the autostabilizer through an amplifier 8. The input to the autostabilizer computer 7 is derived from sensors 9, such as gyros, in well known manner and negative feedback is applied to the computer 7 via the path 10 in accordance with the output from the autostabilizer 5.

The system also includes a flight director display 11 controlled by output signals from a flight director computer 12, the signals being applied to the flight director display 11 through an amplifier 13. The input to the flight director computer is derived from sensors 14 such as gyros or other devices and from inputs relating to the desired flight path which the craft is required to follow. The output of the flight director computer 12 is also controlled by means of negative feedback derived from a pick-off 15 which is responsive to the total movement of the output control rod 6 actuated by both the pilot's control stick 1 and the autostabilizer 5. The flight director 12 is designed to incorporate stabilizing control equations similar, but not necessarily identical, to those of the autostabilizer computer 7 in addition to its flight path error functions.

In operation, similar stabilizing information is supplied to both the autostabilizer computer 7 and the flight director computer 12. During satisfactory operation of the autostabilizer 5, however, the pick-off 15 senses the correction movements applied to the control rod 6 and the resulting negative feedback applied to the flight director computer 12 therefore cancels the stabilizing information computed in that computer. The only information appearing on the flight director display 11, therefore, is that relating to the long term control required to maintain the craft on a desired flight path.

In the event of a failure of the autostabilizer 5, however, the pick-off 15 will no longer provide a negative eedback to cancel the stabilizing information computed in the flight director computer. The required stabilizing information will therefore immediately appear on the flight director 11 and the pilot, without any knowledge of the failure of the autostabilizer 5, will immediately start to apply the necessary correcting control in response to the demands appearing on the flight director display 11. The pilot will, of course, soon be made aware of the failure of the autostabilizer 5 by the changed nature of the demands appearing on the flight director display 11, the important point being that the pilot has retained control of the craft during the period between failure of the autostabilizer 5 and the pilot's recognition of this fact.

Referring now to FIGURE 2 of the drawings there is shown a flight aid system similar to that shown in FIGURE 1 and like parts have therefore been given like reference numerals. In this system, however, the flight director has been replaced by an autopilot 16 controlled by output signals from an autopilot computer 17, the signals being applied to the autopilot 16 through an amplifier 18. The input to the autopilot computer 17 is derived from sensors 19 such as gyros or other devices and from inputs relating to the desired flight path which the craft is required to follow. The output of the autopilot computer 17 is also controlled by means of negative feedback derived from the pick-off 15 and the computer 17 is also designed to incorporate stabilizing control equations similar to those of the autostabilizer computer 7 in addition to its flight path error functions.

The system operates in a manner similar to the system described with reference to FIGURE 1, the stabilizing information being cancelled in the autopilot computer 17 during normal operation of the autostabilizer 5. In the event of a failure of the autostabilizer 5, however, the autopilot 16 is immediately supplied with stabilizing signals. In practice it is likely that the autopilot 16 will have a slower servo response than the autostablizer 5 and if the control movement rates required to stabilize the craft are excessive the autopilot 16 may not be able to apply the full correction necessary to stabilize the craft. Sufficient control of the craft may, however, be maintained to enable the pilot to regain control of the craft.

Referring now to FIGURE 3 of the drawings there is shown a flight aid system combining the two systems described above with reference to FIGURES 1 and 2 and like parts have again been given like reference numerals. In this system the pick-off 15 is designed to supply separate negative feedback signals to the flight director computer 12 and the autopilot computer 17. The flight director 11 and the autopilot 16 are operated in the same manner as described above with reference to FIGURES 1 and 2 respectively. This system has the advantage that when the automatic pilot 16 is in use the demands shown on the flight director display are restrained by the action of the autopilot 16 to small values around the zeros of the displays. In the event of a failure in the autopilot channel or the flight director channel the movements of the flight director indices will increase. The indices of the flight director may therefore be fitted with suitable contact or other detection devices to indicate movement beyond a normal limit, this indication being used to signify a fault condition. Furthermore, if in such a system the flight director computer 12 is used to control two flight directors through two separate amplifiers the contacts or other detection devices in each flight director may be connected in series and the two contact chains thus formed may be connected in parallel so that a failure of one director and its amplifier may be isolated from the more serious event of a failure of the sensors or computer in either the flight director or the autopilot.

Each of the systems described above may be modified by the inclusion of a wash-out network in the feedback path from the pick-off 15 to the flight director computer 12 and/or the autopilot computer 17. By the expression "wash-out" is meant a network which gives zero output during steady state conditions but which responds to transient short term disturbances. The inclusion of such a network ensures that any steady output from the pick-off 15 as a result of failure of the autostabilizer 5 is not applied as a false bias to the flight director computer 12 or the autopilot computer 17. The transient outputs from the pick-off 15 due to movements of the control rod 6, however, remain unaffected.

Although the feedback applied to the flight director computer and/or the autopilot computer has been described above as being derived from a single pick-off 15 on the output control rod 6, the feedback may be derived by combining a feedback signal representing the control movements of the autostabilizer with a feedback signal representing the pilot's or the autopilot's control movements which may be derived from a pick-off on the control rod 3.

What we claim is:

1. A flight aid system for an aircraft having a member to be controlled while the aircraft is in flight including a limited authority autostabilizer, an autostabilizer computer for controlling the operation of said autostabilizer, an output control member operatively connected to the member to be controlled and actuated by said autostabilizer, a flight director display, a flight director computer for controlling said flight director display, said flight director computer being designed to incorporate stabilizing control equations similar to those of said autostabilizer computer in addition to its flight path error functions, and feedback means responsive to the movement of said output control member for applying to said flight director computer during correct operation of said autostabilizer a negative feedback for cancelling the stabilizing information from the output of said flight director computer.

2. A flight aid system as claimed in claim 1 including a pilot-operated control member connected in series with said autostabilizer, and wherein said feedback means comprises pick-off means responsive to the movement of said output control member, said movement being the total of the autostabilizer and the pilot-operated control movements, the output of said pick-off means being fed back to said flight director computer.

3. A flight aid system for an aircraft having a member to be controlled while the aircraft is in flight including a limited authority autostabilizer, an autostabilizer computer for controlling the operation of said autostabilizer, an autopilot, an autopilot computer for controlling the operation of said autopilot, said autopilot computer being designed to incorporate stabilizing control equations similar to those of said autostabilizer computer in additon to its flight path error functions, an output control member connected to the member to be controlled and actuated by both said autostabilizer and said autopilot, and feedback means responsive to the total movement of said output control member for applying to said autopilot computer during correct operation of said autostabilizer a negative feedback for cancelling the stabilizing information from the output of said autopilot computer.

4. A flight aid system as claimed in claim 3 in which said feedback means comprises pick-off means responsive to the total movement of said output control member, the output of said pick-off means being fed back to said autopilot computer.

5. A flight aid system for an aircraft having a member to be controlled while the aircraft is in flight including a limited authority autostabilizer, an autostabilizer computer for controlling the operation of said autostabilizer, a flight director display, a flight director computer for controlling the operation of said flight director display, an autopilot, an autopilot computer for controlling the operation of said autopilot, said flight director computer and said autopilot computer being designed to incorporate stabilizing control equations similar to those of said autostabilizer computer in addition to their flight path error functions, an output control member operatively connected to the member to be controlled and actuated by both said autopilot and said autostabilizer, and feedback means responsive to the total movement of said output control member for applying to said flight director computer and to said autopilot computer during correct operation of said autostabilizer a negative feedback for cancelling the stabilizing information from the output of said flight director computer and from the output of said autopilot computer.

6. A flight aid system as claimed in claim 5 including a pilot-operated control member connected to said output control member, and wherein said feedback means comprises pick-off means responsive to the movement of said output control member, said movements being the total of the autostabilizer movements and the movements of said pilot-operated control member and said autopilot, the output of said pick-off means being fed back to said flight director computer and said autopilot computer.

7. A flight aid system as claimed in claim 5 in which said flight director display includes flight director indices, and means for indicating movements of the flight director indices beyond a predetermined limit.

8. A flight aid system for an aircraft having a member to be controlled while the aircraft is in flight comprising a limited authority autostabilizer, an autostabilizer computer for controlling the operation of said autostabilizer, a control computer designed to incorporate stabilizing control equations similar to those of said autostabilizer computer in addition to flight path error functions, a control member adapted to be acted upon in response to the output of said control computer and connected in series with said autostabilizer, an output control member operatively connected to the member to be controlled and actuated by both said control member and said autostabilizer, and feedback means responsive to the total movement of said output control member for applying to said control computer during correct operation of said autostabilizer a negative feedback for cancelling the stabilizing information from the output of said control computer.

9. A flight aid system as claimed in claim 8 in which said feedback means includes a wash-out network which gives zero output during steady state conditions but which responds to transient short term disturbances.

10. A flight aid system for an aircraft having a member to be controlled while the aircraft is in flight comprising a control rod operatively connected to the member to be controlled, a limited authority autostabilizer connected in series with said control rod, an autostabilizer computer having an input connected to said autostabilizer for controlling the operation of said autostabilizer, a flight director for providing to the pilot of the aircraft a visual display of computed flight information, a flight director computer having an output connected to said flight director for controlling the operation of said flight director, a control stick manually operable by the pilot of the aircraft connected to said control rod and adapted to be positioned in accordance with said visually displayed computed flight information, an autopilot, an autopilot computer having an output connected to said autopilot for controlling the operation of said autopilot, said flight director computer and said autopilot computer being designed to incorporate stabilizing control equations similar to those of said autostabilizer computer in addition to flight path error functions, means connecting the output of said autopilot to said control rod, whereby said control rod is actuated by both said autopilot and said autostabilizer and by said control stick, and feedback means for applying to said flight director computer and to said autopilot computer during correct operation of said autostabilizer a negative feedback for cancelling the stabilizing information from the outputs of said flight director computer and said autopilot computer, said feedback means comprising pick-off means responsive to the total movement of said control rod, the output of said pick-off means being fed back to both said flight director computer and said autopilot computer.

References Cited
UNITED STATES PATENTS

| | | |
|---|---|---|
| 2,548,278 | 4/1951 | Wirkler. |
| 2,751,541 | 6/1956 | Schuck _____ 235—150.2 X |
| 2,869,804 | 1/1959 | Muinch et al. ____ 235—150.2 X |
| 2,996,268 | 8/1961 | Broun et al. ____ 235—150.25 X |
| 3,221,230 | 11/1965 | Osburn. |

FOREIGN PATENTS 815,137  6/1959  Great Britain.

MALCOLM A. MORRISON, *Primary Examiner.*

I. KESCHNER, *Assistant Examiner.*